US005568368A

United States Patent [19]
Steigerwald et al.

[11] Patent Number: 5,568,368
[45] Date of Patent: Oct. 22, 1996

[54] SQUARE-WAVE CONVERTERS WITH SOFT VOLTAGE TRANSITIONS FOR AC POWER DISTRIBUTION SYSTEMS

[75] Inventors: Robert L. Steigerwald, Burnt Hills; Gerald W. Ludwig, Scotia, both of N.Y.

[73] Assignee: General Electric Company, Schenectady, N.Y.

[21] Appl. No.: 595,453

[22] Filed: Feb. 5, 1996

Related U.S. Application Data

[63] Continuation of Ser. No. 55,600, May 3, 1993, abandoned.

[51] Int. Cl.$^6$ .................................................. H02M 3/335
[52] U.S. Cl. ............................................. 363/17; 363/132
[58] Field of Search ............................... 363/170, 24, 25, 363/26, 132, 133, 134

[56] References Cited

U.S. PATENT DOCUMENTS

| | | | |
|---|---|---|---|
| 4,855,888 | 8/1989 | Henze et al. | 363/17 |
| 4,860,184 | 8/1989 | Tabisz et al. | 363/17 |
| 4,876,635 | 10/1989 | Park et al. | 363/132 |
| 5,001,621 | 3/1991 | Egawa | 363/132 |
| 5,047,913 | 9/1991 | DeDoncker et al. | 363/138 |
| 5,132,889 | 7/1992 | Hitchcock et al. | 363/17 |
| 5,157,593 | 10/1992 | Jain | 363/17 |
| 5,208,738 | 5/1993 | Jain | 363/132 |
| 5,245,520 | 9/1993 | Imbertson | 363/132 |
| 5,251,119 | 10/1993 | Maehara | 363/132 |
| 5,285,372 | 2/1994 | Huynh et al. | 363/132 |

Primary Examiner—Jeffrey L. Sterrett
Attorney, Agent, or Firm—Jill M. Breedlove; Marvin Snyder

[57] ABSTRACT

A converter for an ac power distribution system provides a square-wave voltage of low output impedance to an ac power distribution bus for driving a plurality of loads, each load including a rectifier and an input filter capacitor. Slew-rate limiting capacitors are employed to limit the rate of change of voltage on the ac distribution bus, thereby substantially reducing or eliminating conducted and radiated interference from the power distribution system due to high-frequency components of current which would otherwise flow in parasitic capacitances. In addition, zero-voltage switching is employed to achieve highly efficient converter operation. As other advantages, this converter scheme allows for simplification of converters at the load end of the power distribution system (e.g., to simple rectifiers with post regulators), while producing lower ac line currents, lower current harmonics and higher power factors than those of a sine-wave generation system.

17 Claims, 5 Drawing Sheets

$$T \leq \frac{\pi}{2}\sqrt{L_r(C1 + C2)}$$

$T \approx \pi \sqrt{[L_r C_S]}$
$C_S = C1 + C2 + C3 + C4$

SQUARE-WAVE CONVERTERS WITH SOFT VOLTAGE TRANSITIONS FOR AC POWER DISTRIBUTION SYSTEMS

This application is a Continuation of application Ser. No. 08/055,600 filed May 3, 1993, now abandoned.

FIELD OF THE INVENTION

The present invention relates generally to power converters and, more particularly, to square-wave converters for providing low-impedance square-wave voltages suitable for driving the distribution bus of an ac power system.

BACKGROUND OF THE INVENTION

A square-wave converter in an ac distributed power system is typically simple to implement and has a lower voltage rating than an equivalent sine-wave converter. Moreover, a square-wave converter has lower line current harmonics if the majority of loads are non-linear (e.g., rectifiers). However, if fast transitions are allowed during switching of the square wave, currents flow in parasitic capacitances to ground, and the higher frequency components thereof can cause both conducted and radiated interference with sensitive equipment.

Accordingly, it is desirable to provide a square-wave converter which limits the rate of change of voltage (i.e., the slew rate) on an ac distribution bus in order to reduce interference due to parasitic system capacitances. Furthermore, it is also desirable to present a low driving point impedance to the ac distribution bus so that the bus voltage does not vary substantially with the load. Still further, it is desirable to provide such a square-wave converter which operates with zero-voltage switching of the power switches and is thus highly efficient.

SUMMARY OF THE INVENTION

A converter for an ac power distribution system provides a square-wave voltage of low output impedance to an ac power distribution bus for driving a plurality of loads, each load comprising a rectifier and a filter capacitor. Such a converter includes a half-bridge or full-bridge configuration of power switching devices and a resonant inductor. Slew-rate limiting capacitors are employed to shunt current during turn-off of each of the power switching devices. Switch means provide a resonant current path through the resonant inductor such that the resonant inductor resonates with the slew-rate limiting capacitors. As a result, the ac power distribution bus voltage resonates between positive and negative voltage rails during a time which is substantially determined by the values of the slew-rate limiting capacitors and the resonant inductor. Hence, the rate of change of voltage on the ac distribution bus is limited and is furthermore substantially independent of the loads. Also, conducted and radiated interference from the power distribution system due to high-frequency components of current which would otherwise flow in parasitic capacitances is substantially reduced or eliminated. In addition, zero-voltage switching is employed to achieve highly efficient converter operation, while high-capacity input capacitors are employed to present a low impedance to the ac distribution bus during power switching device conduction intervals. As other advantages, this converter scheme allows for simplification of converters at the load end of the power distribution system (e.g., to simple rectifiers with post regulators), while producing lower peak ac line current, lower current harmonics and higher power factors than those of a sine-wave generation system.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
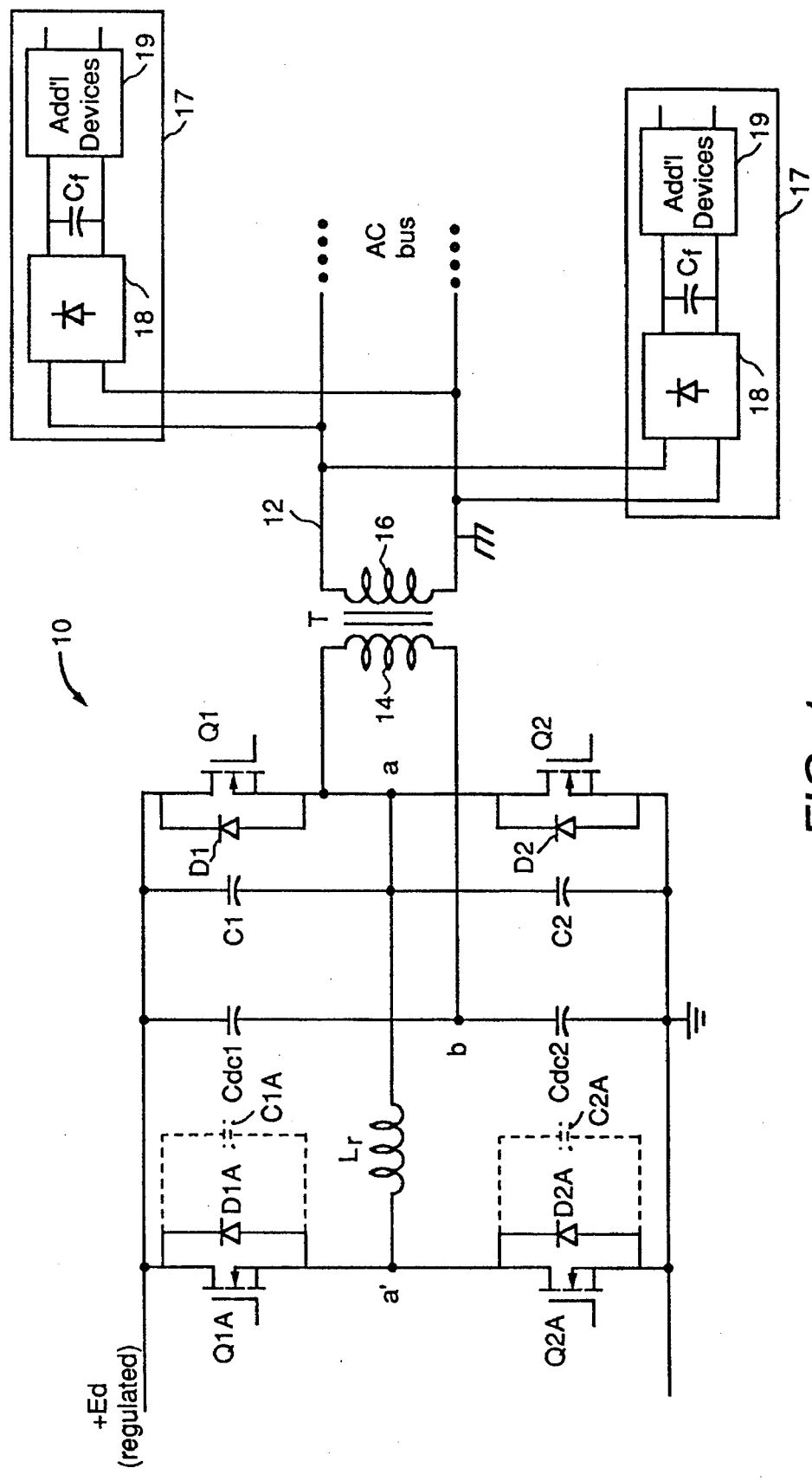
FIG. 1 schematically illustrates a square-wave converter in an ac power distribution system according to one embodiment of the present invention.

FIG. 1 illustrates a converter 10 for providing a square-wave voltage (i.e., a quasi-square-wave voltage) to an ac distribution bus 12 in accordance with the present invention. Converter 10 comprises a half-bridge converter with main power switching devices Q1 and Q2 coupled in a half-bridge configuration between a regulated dc bus voltage +Ed and a common potential, shown as ground. Switching devices Q1 and Q2 each have a diode D1 and D2, respectively, coupled in antiparallel therewith. The antiparallel diodes may be separate devices or may be integral with the particular types of switching devices used, as in, for example, the illustrated field effect transistors (FET's). (FET's are shown by way of illustration only; other suitable types of power switching devices may be employed, such as, for example, insulated gate bipolar transistors (IGBT's) or MOS-controlled thyristors (MCT's), among others.) Converter 10 further includes auxiliary switching devices Q1A and Q1B coupled in a half-bridge configuration between regulated dc bus voltage +Ed and ground. The auxiliary switching devices are also shown as FET's; however, other suitable gate turn-off devices could be used, such as, for example, IGBT's or gate turn-off thyristors (GTO's). An auxiliary diode D1A and D2A, respectively, is coupled in antiparallel with each respective auxiliary switching device Q1A and Q2A, respectively. A resonant inductor Lr is coupled between junctions a and a' joining switching devices Q1–Q2 and Q1A–Q2A, respectively, of each half-bridge. Slew-rate limiting capacitors C1 and C2 are coupled in parallel with each main switching device Q1 and Q2, respectively. Slew-rate limiting capacitors C1 and C2 limit the rate of change of voltage on the ac distribution bus and furthermore provide substantially lossless turn-off snubbing for the main power switching devices, as described hereinbelow. DC link capacitors Cdc1 and Cdc2, respectively, are coupled together in series at a junction b, the series combination of the dc link capacitors being coupled between regulated dc bus voltage +Ed and ground. A primary winding 14 of a transformer T is coupled between junctions a and b. A secondary winding 16 of transformer T is coupled to a plurality of loads 17 on the ac distribution bus. Each load 17 typically comprises a rectifier 18, an input filter capacitor Cf, and additional devices 19 (e.g., linear regulators) which act to sink load current.

FIGS. 2a–2f graphically illustrate operation of converter 10 of FIG. 1 as follows: (a) the gate voltage of main device Q1; (b) the gate voltage of auxiliary device Q2A; (c) the gate voltage of main device Q2; (d) the gate voltage of auxiliary device Q1A; (e) the ac distribution bus voltage $v_a$-$v_b$; and (f) the resonant inductor current $i_{Lr}$.

Assume that device Q1 is conducting. At the end of its half-cycle of conduction, device Q1 turns off, and the current therethrough is shunted into slew-rate, limiting capacitors C1 and C2 as the voltage across device Q1 increases. The result is substantially lossless turn off of device Q1. Furthermore, as the voltage across device Q1 increases, the voltage at junction a decreases. Since the filter capacitors Cf maintain an almost constant voltage at the load, when the ac distribution bus voltage drops, the load rectifiers become back-biased and the loads are effectively disconnected from the converter. As a result, there is no current in slew-rate limiting capacitors C1 and C2 to drive the voltage at junction a to the negative rail voltage. At this point, however, auxiliary device Q2A turns on, such that resonant inductor Lr resonates with slew-rate limiting capacitors C1 and C2 to drive the voltage at junction a to the negative rail voltage. The time during which the voltage at junction a transitions from the positive rail voltage to the negative rail voltage (i.e., the slew rate) is a function of the capacitive values of slew-rate limiting capacitors C1 and C2 and the inductive value of resonant inductor Lr. Advantageously, the transition time is not a function of the load since the load has been effectively disconnected, as described hereinabove.

After the voltage at junction a reaches the negative rail voltage, diode D2 turns on as the current built up in resonant inductor Lr circulates through resonant inductor Lr, auxiliary device Q2A and diode D2. Switching device Q2 thus turns on with zero voltage thereacross (i.e., zero-voltage switching). At this time, auxiliary device Q2A turns off, and the voltage at junction a' rapidly rises to the positive rail voltage, at which point auxiliary diode D1A starts conducting. In one embodiment, a small capacitance C2A (which could comprise a parasitic capacitance of device Q2A), as shown in phantom in FIG. 1, is placed in parallel with device Q2A in order to achieve low turn-off switching losses therefor; and similarly, as shown in phantom, a small capacitance C1A is placed in parallel with device Q1A.

Figure 2A:
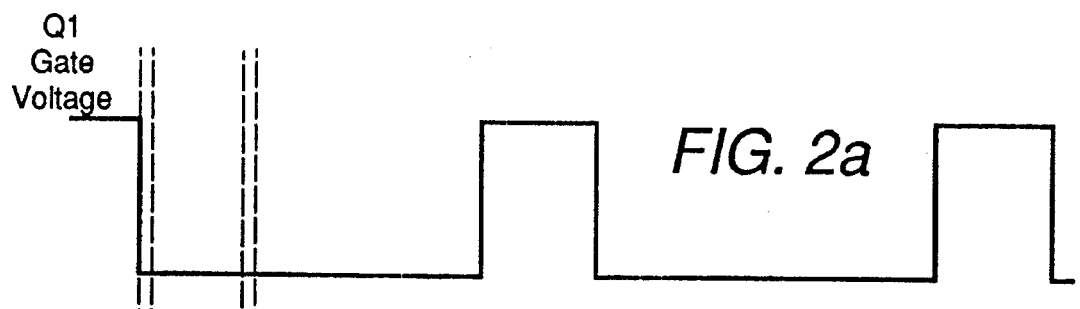
FIGS. 2a–2f graphically illustrate ideal voltage and current waveforms for the converter of FIG. 1.
Figure 2B:
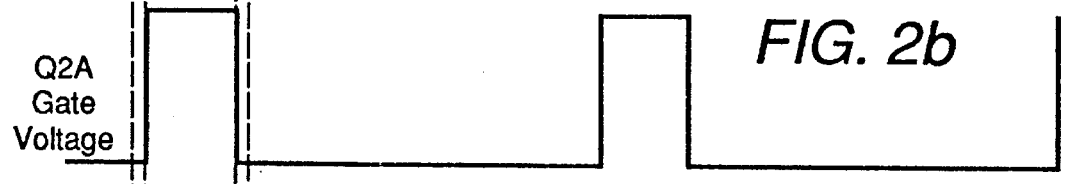
Figure 2C:
Figure 2D:
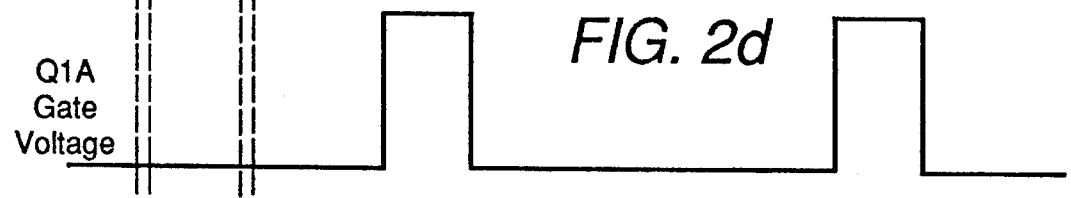
Figure 2E:
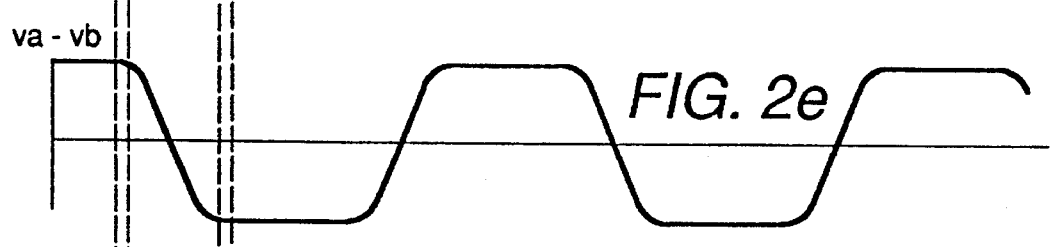
Figure 2F:
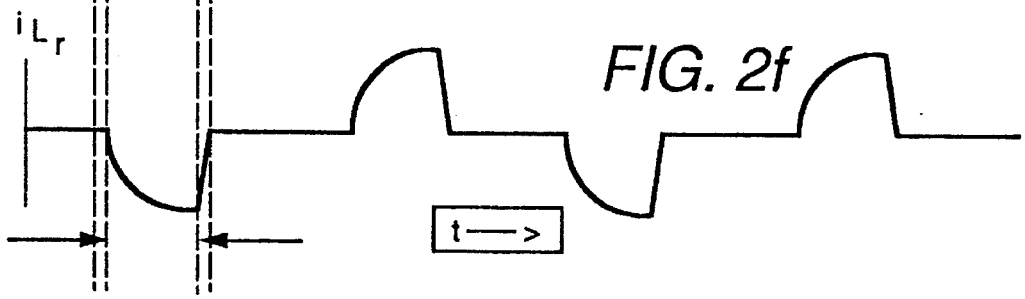

At this point, there is a sufficiently high voltage across resonant inductor Lr to drive its current to zero. Inductor Lr conducts only for a relatively short time such that conduction losses are low. In addition, the resonant inductor current pulses, as shown in FIG. 2f, are relatively small and are furthermore not related to the load current magnitude, assuming rectifier loads with capacitive input filters as shown. DC link capacitors Cdc1 and Cdc2, which each have a relatively high capacity, are connected directly to the ac distribution bus through transformer T when either Q1 or Q2 is conducting, resulting in a low impedance presented to the ac distribution bus, even at relatively high frequencies.

Figure 3:
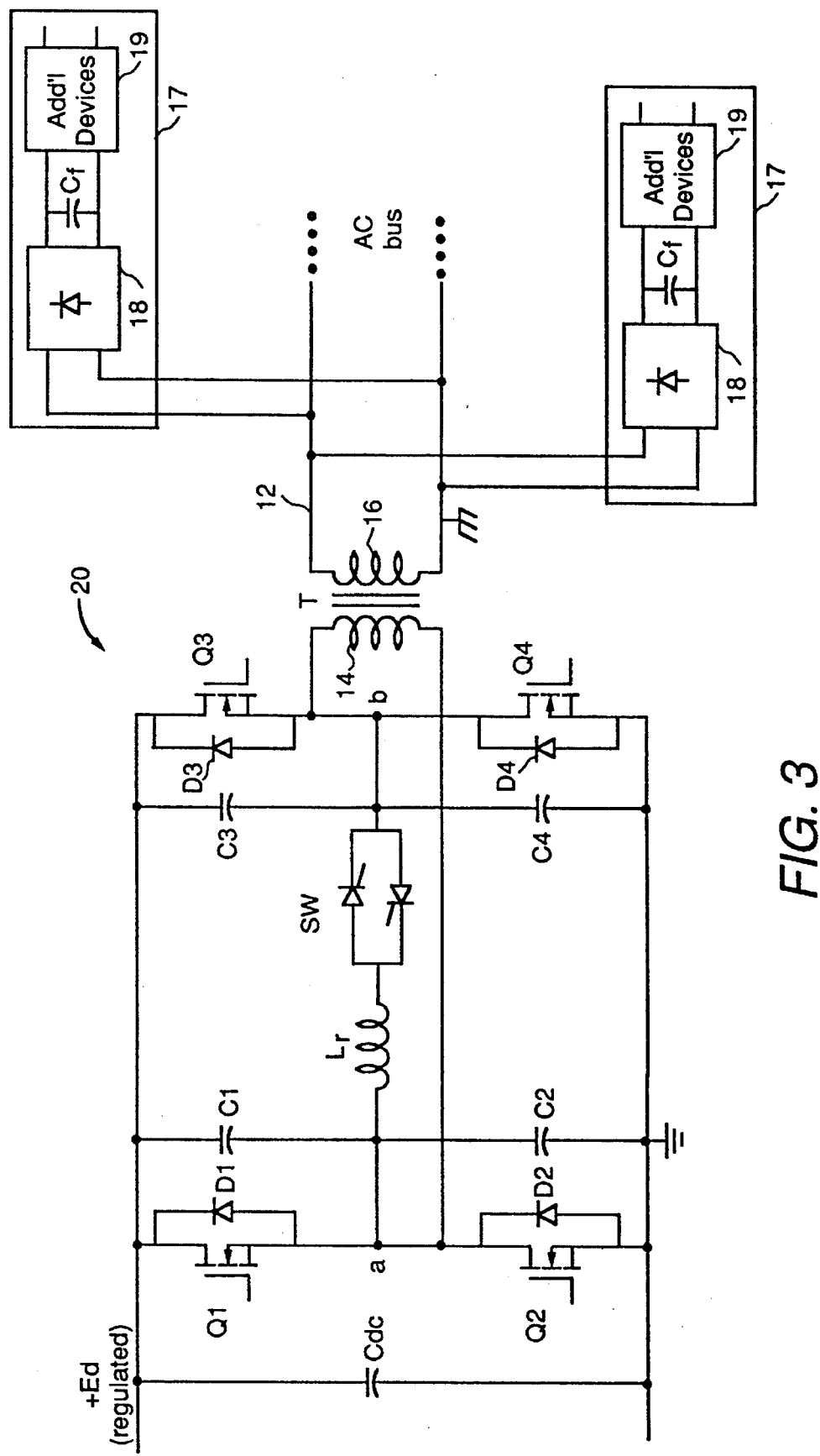
FIG. 3 schematically illustrates a square-wave converter in an ac power distribution system according to an alternative embodiment of the present invention.

FIG. 3 illustrates an alternative embodiment of a converter for providing a substantially square-wave voltage (i.e., a quasi-square-wave voltage) to an ac power distribution system according to the present invention. Converter 20 of FIG. 3 comprises four switching devices Q1–Q4 connected in a full-bridge configuration between regulated dc bus voltage +Ed and ground. Switching devices Q1–Q4 each have a diode D1–D4, respectively, coupled in antiparallel therewith and further each have a slew-rate limiting capacitor C1–C4, respectively, coupled in parallel therewith. A capacitor Cdc of relatively high capacity is coupled at the input of the converter between the regulated dc voltage +Ed and ground. A series combination of a resonant inductor Lr and a bidirectional switch SW is coupled between junction a joining switching devices Q1 and Q2 and junction b joining switching devices Q3 and Q4. By way of example, switch SW is shown as comprising two antiparallel thyristors; however, other suitable bidirectional switching devices may be employed, such as, for example, IGBT's or GTO's, among others.

Figure 4A:
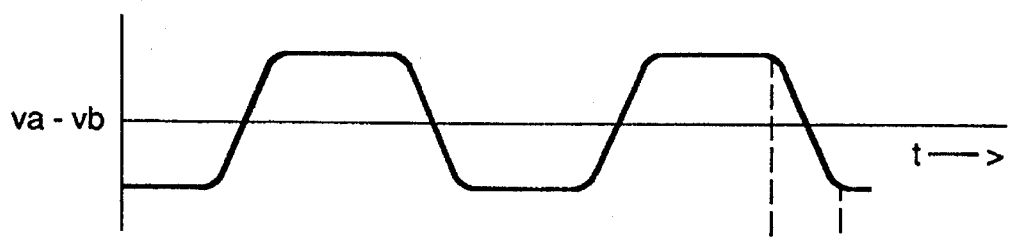
FIGS. 4a and 4b graphically illustrate ideal bus voltage and resonant inductor current waveforms, respectively, for the converter of FIG. 3.
Figure 4B:
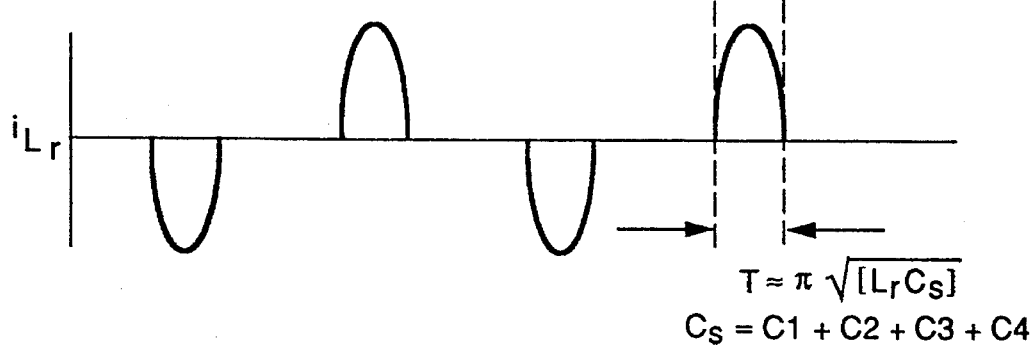

Assume that devices Q1 and Q4 of converter 20 are conducting. At the end of the half-cycle of conduction, Q1 and Q4 turn off. The ac distribution bus voltage begins to decrease, and the loads become effectively disconnected from the converter. At that point, switch SW is turned on. As a result, resonant inductor Lr rings with slew-rate limiting capacitors C1–C4, such that the voltages at junctions a and b resonate to the opposite rail voltages, as illustrated graphically in FIGS. 4a and 4b. If there is still current in resonant inductor Lr when junctions a and b reach the opposite respective rail voltages, then diodes D2 and D3 turn on for a short time until the resonant inductor current $i_{Lr}$ reaches zero. At that point, devices Q2 and Q3 are turned on with zero voltage thereacross. Hence, there are substantially no turn-on switching losses. Moreover, since the slew-rate limiting capacitors are coupled directly across the respective switching devices at turn-off, there are substantially no turn-off switching losses. Devices Q2 and Q3 conduct for the remainder of the half cycle. At the end of the half cycle, devices Q2 and Q3 turn off, and switch SW turns on to provide the opposite resonant transition. The relatively high capacity dc link capacitor Cdc is connected directly to the ac distribution bus through transformer T when either devices Q1 and Q4 or devices Q2 and Q3 are conducting, resulting in presentation of a low impedance to the ac distribution bus, even at relatively high frequencies. In addition, since the loads typically comprise rectifiers and input filter capacitors, the resonant transitions are independent of the load. The result is a low impedance ac distribution bus that is regulated substantially as well as the dc input bus +Ed. Furthermore, centralized energy storage is provided efficiently (at high energy per unit volume) by the dc link capacitor Cdc so that less energy must be stored by the load filter capacitors Cf.

Figure 5:
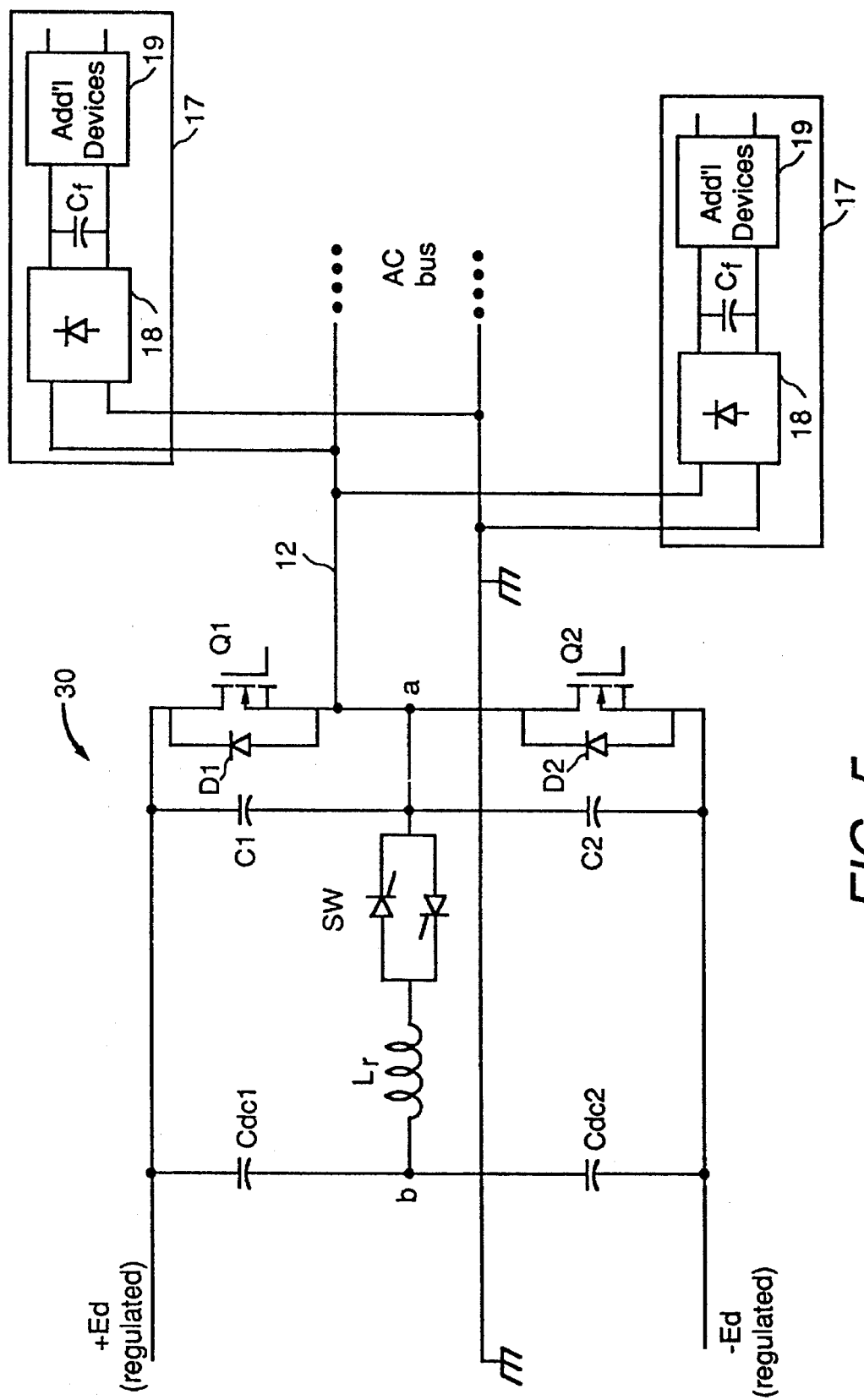
FIG. 5 schematically illustrates a square-wave converter in an ac power distribution system according to another alternative embodiment of the present invention.

FIG. 5 illustrates another alternative embodiment of a converter for generating a substantially square-wave voltage (i.e., quasi-square-wave) to an ac distribution bus in accordance with the present invention. In particular, converter 30 of FIG. 5 comprises switching devices Q1 and Q2 coupled in a half-bridge configuration. A series combination of resonant inductor Lr and switch SW is connected between junction a joining switching devices Q1 and Q2 and junction b joining a pair of relatively high-capacity input capacitors Cdc1 and Cdc2 coupled in series between the regulated dc bus voltage +Ed and voltage –Ed. Junctions a and b are shown as directly connected to the ac distribution bus, i.e., without a transformer. For this configuration, the center point of the input dc source (junction b) is grounded, e.g., connected to the center point of a three-phase generator. Operation is essentially the same as that of the embodiment of FIG. 3, except that, without the transformer coupling to the ac distribution bus, there is no ohmic isolation between the converter and the loads, and that voltage transformation degree of freedom is removed. However, the converter of FIG. 5 iS smaller and has less mass since there is no transformer.

The dc input voltage +Ed for all embodiments described hereinabove is regulated in well-known fashion. For example, a preconditioner of a type that converts alternator inputs and battery inputs can provide the regulated dc input voltage.

Advantageously, a converter according to the present invention is highly efficient due to negligible device switching losses and the relatively short length of the resonant current pulse. In addition, device conduction losses are low as a result of employing square-wave currents rather than sinusoidal currents. Furthermore, the resonant current pulses do not flow through the main power switching devices, also reducing conduction losses. As other advantages, the converter scheme of the present invention allows for simplification of converters at the load end of the power distribution system (e.g., to simple rectifiers with post regulators), while producing lower ac line current harmonics and higher power factors than those of a sine-wave generation system. Still further, the energy storage by the dc link capacitor provides low output impedance (i.e., a "stiff" bus). Such centralized energy storage, being at high voltage, is volume efficient and allows the load filter capacitors to be relatively small and inexpensive.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power converter for converting a dc voltage to a square-wave voltage for supplying a plurality of loads via an ac distribution bus in an ac power distribution system, comprising:

first and second power switching devices coupled in a half-bridge configuration between a first dc bus voltage and a second dc bus voltage, said first and second power switching devices each having a diode coupled in antiparallel therewith;

an input capacitance coupled between said first dc bus voltage and said second dc bus voltage, said input capacitance being sufficiently high to present a relatively low impedance to said ac power distribution bus;

a slew-rate limiting capacitor coupled in parallel with each of said power switching devices for shunting current therethrough during turn-off of each of said switching devices an auxiliary circuit comprising a resonant inductor coupled to the junction between said first and second power switching devices and switch means coupled to said resonant inductor, for periodically driving current to zero in said inductor said slew-rate limiting capacitors limiting the rate of change of voltage on said ac distribution bus such that the rate of change of voltage on said ac distribution bus is determined by the values of said slew-rate limiting capacitors and said resonant inductor and is substantially independent of said loads, said resonant inductor resonating with said slew-rate limiting capacitors such that said ac power distribution bus voltage resonates between positive and negative rail voltages during a time substantially determined by the values of said slew-rate limiting capacitors and said resonant inductor.

2. The power converter of claim 1, further comprising transformer means for coupling said converter to said ac power distribution bus.

3. The power converter of claim 1 wherein said power switching devices are switched with substantially zero voltage thereacross.

4. The power converter of claim 1 wherein each of said loads comprises a rectifier and an input filter capacitor.

5. The power converter of claim 1 wherein said switch means comprises a pair of auxiliary switching devices coupled in a half-bridge configuration between said first dc bus voltage and said second dc bus voltage, each of said auxiliary switching devices having a diode coupled in antiparallel therewith, said resonant inductor being connected between the junction joining said first and second switching devices and the junction joining said auxiliary switching devices.

6. The power converter of claim 5 wherein each of said loads comprises a rectifier and an input filter capacitor.

7. The power converter of claim 5 wherein said input capacitance comprises a pair of input capacitors coupled in series between said first dc bus voltage and said second dc bus voltage, said input capacitors having a sufficiently high capacitance and being directly transformer-coupled to said ac power distribution bus during conduction intervals of said power switching devices to present a relatively low impedance to said ac power distribution bus.

8. The power converter of claim 5, further comprising a snubber capacitor coupled in parallel with each auxiliary switching device.

9. The power converter of claim 5, further comprising transformer means for coupling said converter to said ac power distribution bus.

10. The power converter of claim 5 wherein said power switching devices are switched with substantially zero voltage thereacross.

11. The power converter of claim 5 wherein said input capacitance comprises a pair of input capacitors coupled in series between said first dc bus voltage and said second dc bus voltage.

12. The power converter of claim 11 wherein said switch means is coupled in series with said resonant inductor between the junction joining said first and second switching devices and the junction joining said input capacitors.

13. The power converter of claim 12 wherein said power switching devices are switched with substantially zero voltage thereacross.

14. The power converter of claim 1, further comprising third and fourth power switching devices coupled in a half-bridge configuration between said first dc bus voltage and said second dc bus voltage, said third and fourth power switching devices each having a diode coupled in antiparallel therewith and each further having a slew-rate limiting capacitor coupled in parallel therewith, said first, second, third and fourth power switching devices being configured as a full bridge.

15. The power converter of claim 14, further comprising transformer means for coupling said converter to said ac power distribution bus.

16. The power converter of claim 14 wherein said power switching devices are switched with substantially zero voltage thereacross.

17. The power converter of claim 14 wherein said switch means is coupled in series with said resonant inductor between the junction joining said first and second switching devices and the junction joining said third and fourth switching devices in order to provide a current pulse such that the rate of change of voltage on said ac distribution bus is substantially independent of said loads, thereby maintaining said slew rate at very light loads independent of load current.

* * * * *